(12) United States Patent
Roest et al.

(10) Patent No.: US 8,659,124 B2
(45) Date of Patent: Feb. 25, 2014

(54) PHYSICAL STRUCTURE FOR USE IN A PHYSICAL UNCLONABLE FUNCTION

(75) Inventors: Aarnoud Laurens Roest, Geldrop (NL); Linda Van Leuken-Peters, Maarheeze (NL); Robertus Andrianus Maria Wolters, Eindhoven (NL)

(73) Assignee: NXP B.V., Eindhoven (NL)

( * ) Notice: Subject to any disclaimer, the term of this patent is extended or adjusted under 35 U.S.C. 154(b) by 287 days.

(21) Appl. No.: 13/141,208

(22) PCT Filed: Dec. 21, 2009

(86) PCT No.: PCT/IB2009/055887
§ 371 (c)(1),
(2), (4) Date: Jun. 21, 2011

(87) PCT Pub. No.: WO2010/076733
PCT Pub. Date: Jul. 8, 2010

(65) Prior Publication Data
US 2011/0254141 A1    Oct. 20, 2011

(30) Foreign Application Priority Data

Dec. 29, 2008 (EP) .................................... 08172962

(51) Int. Cl.
*H01L 29/92* (2006.01)

(52) U.S. Cl.
USPC ............ 257/639; 257/E29.342; 257/E21.008; 438/393

(58) Field of Classification Search
USPC ............ 257/639, E29.342, E21.008; 438/393
See application file for complete search history.

(56) References Cited

U.S. PATENT DOCUMENTS

| | | | |
|---|---|---|---|
| 5,818,738 A | 10/1998 | Effing | |
| 2004/0135183 A1 | 7/2004 | Matsuura et al. | |
| 2006/0003488 A1* | 1/2006 | Huang | 438/99 |
| 2007/0287248 A1* | 12/2007 | Matsumoto | 438/240 |
| 2008/0121957 A1 | 5/2008 | Kanaya | |

FOREIGN PATENT DOCUMENTS

| | | |
|---|---|---|
| EP | 0 821 415 A2 | 1/1998 |
| JP | 2000-091513 A | 3/2000 |
| JP | 2006-245383 A | 9/2006 |

OTHER PUBLICATIONS

International Search Report for Patent Appln. PCT/IB2009/055887 (Mar. 26, 2010).

* cited by examiner

*Primary Examiner* — Long Pham

(57) ABSTRACT

The invention relates to a semiconductor device comprising a physical structure (50) for use in a physical unclonable function, wherein the physical structure (50) comprises a lead-zirconium titanate layer (25), and a silicon-comprising dielectric layer (27) deposited on the lead-zirconium-titanate layer (25), wherein the silicon-comprising dielectric layer (27) has a rough surface (SR), the physical structure (50) further comprising a conductive layer (30) provided on the rough surface (SR) of the silicon-comprising dielectric layer (27). The invention further relates to a method of manufacturing such semiconductor device. The invention also relates to a card, such as a smartcard, and to a RFID tag comprising such semiconductor device. The inventors have found that depositing of a silicon-comprising dielectric layer (27) on a lead-zirconium titanate layer (25) using vapor deposition results in a silicon-comprising dielectric layer (27) having a rough surface (SR). This rough surface (SR) can be used in a PUF to make a resistor (R) with a variable random value by depositing a conductive layer (30) on the rough surface (SR). Alternatively, the combination of both layers (25, 27) can be used in a PUF as composite dielectric to make a capacitor (C) with a variable random capacitance value.

15 Claims, 3 Drawing Sheets

PHYSICAL STRUCTURE FOR USE IN A PHYSICAL UNCLONABLE FUNCTION

FIELD OF THE INVENTION

The invention relates to semiconductor device comprising a physical structure for use in a physical unclonable function, to a method of manufacturing such semiconductor device comprising a physical structure for use in a physical unclonable function, and to a card or an RFID tag comprising such semiconductor device.

BACKGROUND OF THE INVENTION

Integrated circuits (IC's) for applications such as smartcards, RFID tags, Pay-TV chips often contain a secret security key and carry out secret functions. The IC needs to be secure against attacks from the outside which aim at retrieving data there from. IC's may be subjected to both front-side as well as back-side attacks. In this description the "front-side" of a semiconductor device is defined as the side of the semiconductor device on which circuitry is provided. This side is also being referred to as the "first side of the substrate" in this description. Likewise, the "back-side" of the semiconductor device is defined as the side opposite to the front-side and this side is also being referred to as the "second side of the substrate" in this description. Back-side attacks may consist of various analysis techniques such as light or photon emission detection, thermal infrared detection, liquid crystal detection, voltage or electric field detection, and electro magnetic detection methods. Often these methods are used in combination with invasive attacks such as wafer thinning, laser cutting and heating, focused ion beam (FIB) techniques. Also light or laser flash methods are used from the back-side in order to force signals to flip. When any one of the above-mentioned techniques is used in combination with mathematical attacks, these attacks can be very powerful.

To counteract the ever-increasing physical and mathematical attacks described above, various kinds of tamper protection schemes have been reported, both for front-side as well as back-side. Tamper protection schemes become stronger when they are combined with cryptography. Recently, so-called Physical unclonable Functions (PUFs) were introduced by Pappu et. al. in "*Physical One-Way Functions*", MIT, March 2001. This disclosure presented a PUF as a cost-effective way of generating secure keys for cryptographic purposes. A PUF is a function that is embodied in a physical structure that is easy to evaluate but hard to characterize. The physical structure that contains the PUF consists of at least one random component. This random component is introduced during the manufacturing process and cannot be easily controlled. PUF's are described for use as a hash function and for authentication purposes. Because through PUF's the data is stored essentially in a material rather than in a circuit, the technology can also be used as part of a device that needs authentication, such as a security sensor. Many further developments focus on developing different types of PUF's. The application of PUF's focuses on using PUF's as unique identifiers for smartcards (fingerprinting) and credit cards or as a 'cheap' source for key generation (common randomness) between two parties based on the very useful properties of PUF of the uniqueness of the responses and unclonability of the PUF (see also P. Tuyls et. al., "Information-Theoretic Security Analysis of Physical Unclonable Functions".

An important aspect of a physical structure for a PUF is that its physical properties are such that an electric property, such as a capacitance or a resistance, can be derived from it which is not (easily) reproducible. This means that the respective electrical property behaves stochastically, i.e. varies within a single semiconductor device (having multiple physical structure), varies within a single batch of semiconductor devices, and varies between multiple batches. The larger the variation of the respective electrical property the more information is contained in the PUF.

A problem with the known PUF's is that the variation of the respective electrical property is limited.

SUMMARY OF THE INVENTION

It is an object of the invention to provide a semiconductor device comprising a physical structure for a PUF which exhibits a larger variation in the respective electrical property. It is a further object of the invention to provide a method of manufacturing such semiconductor device.

The invention is defined by the independent claims. The dependent claims define advantageous embodiments.

In a first aspect, the invention relates to a semiconductor device comprising a physical structure for use in a physical unclonable function, wherein the physical structure comprises a lead-zirconium titanate layer, and a silicon-comprising dielectric layer deposited on the lead-zirconium-titanate layer, wherein the silicon-comprising dielectric layer has a rough surface, the physical structure further comprising a conductive layer provided on the rough surface of the silicon-comprising dielectric layer.

The effect of the features of the semiconductor device in accordance with the invention will be explained hereinafter.

The conductive layer on the rough surface of the silicon-comprising dielectric layer can be used in different ways to obtain a physical structure for a PUF. A first way is to use the conductive layer that is provided on the rough surface of the silicon-comprising dielectric layer as a variable resistance. The roughness of the silicon-comprising dielectric layer can be in the same order of magnitude as the dimensions of the conductive layer which can lead to a large spread in the resistance values. A second way is to provide the physical structure (with the lead-zirconium titanate layer) on a further conductive layer to form a capacitor with a variable capacitance. It must be stressed that with the term "variable" is here meant that at least one physical property (and thus the respective electrical property) varies when the physical structure is manufactured again. In case of a physical structure as part of the capacitor the effective k-value of the dielectric stack is relatively high, because of the high k-value of the lead-zirconium-titanate layer, i.e. around 1000 (for thin film materials). The k-value of monocrystalline PZT can be (much) higher. The silicon-comprising dielectric layer has typically a very low-k value, i.e. in the range 4 to 7.

Effectively, the PZT layer increases the effective k-value of the physical structure (beneficial in case of a capacitor) and also increases the break-down voltage of the capacitor (beneficial in case of a capacitor and in case a resistor forms a parasitic capacitance to a neighboring conductor).

This rough surface is most likely the result of physical-chemical process that happens during the vapor deposition. First, lead-oxide (PbO) reduction in the lead-zirconium-titanate layer is initiated by hydrogen. Subsequently, lead-oxide disintegrates into lead and oxide elements or (other) hydrogen containing oxides (hydroxides). The lead elements then act as catalyst in the deposition process which results in the growth of nanostructures (in a vapor-liquid-solid mechanism). When the deposition process continues eventually the whole surface of the lead-zirconium-titanate layer will be covered with material, however this surface will be rough.

In an embodiment of the semiconductor device in accordance with the invention the conductive layer comprises a plurality of conductors for forming a plurality of electrical elements for use in the physical unclonable function. Implementing more electrical elements enables the extraction of more information, i.e. bits, for a PUF. In the PUF this information may for example be used as an encryption key for encrypting data.

In an embodiment of the semiconductor device in accordance with the invention the plurality of conductors are formed as resistances for use in the physical unclonable function. This embodiment constitutes a first main variant of the invention, wherein the physical structures are effectively used as variable resistances, i.e. to form a resistive PUF.

In an embodiment of the semiconductor device in accordance with the invention the physical structure further comprises a further conductive layer onto which the lead-zirconium-titanate layer is provided for forming at least one capacitor between the conductive layer and the further conductive layer. This embodiment constitutes a second main variant of the invention, wherein the physical structures are effectively used as variable capacitances, i.e. to form a capacitive PUF.

In an embodiment of the semiconductor device in accordance with the invention locally the silicon-comprising dielectric layer is planar for forming a reference capacitor. At the location where the silicon-comprising dielectric layer is planar the capacitor is defined and may thus be used as a reference capacitor. This reference capacitor may have a higher effective k-value than the remaining part of the structure having the rough surface, because the silicon-comprising dielectric layer can be effectively thinner and has a low-k value (this is at least true when the silicon comprising dielectric is planarized by a CMP step for example. The effective k-value of the reference capacitor can be anywhere between 4 (k-value of low k silicon comprising dielectric material) and 800-1700 (k-value of high-k PZT layer) but the average value will be between about 50 and about 300 (using a 300 nm PZT layer combined with a 10-100 nm dielectric layer).

In an embodiment of the semiconductor device in accordance with the invention locally the conductive layer is directly provided on the lead-zirconium-titanate layer for forming a further reference capacitor. At the location where the silicon-comprising dielectric layer is completely removed the capacitor is defined and may thus be used as a further reference capacitor. In this embodiment, however, the effective k-value is even higher, because the further reference capacitor is fully defined by the k-value of the lead-zirconium-titanate (PZT) layer, which is typically in the range 800 to 1700.

In an embodiment of the semiconductor device in accordance with the invention the semiconductor device comprises a substrate and an electronic circuit integrated into the substrate. In many applications there is the electronic circuit which needs to be protected against hackers who will try to obtain any data contained therein. In this embodiment the data in the electronic circuit can be protected by means of the physical structure which can be used as part of a PUF.

In an embodiment of the semiconductor device in accordance with the invention the substrate comprises a semiconductor body and an interconnect stack provided on the semiconductor body, and the electronic circuit comprises electronic components and interconnections between the electronic components, wherein the electronic components are integrated into the semiconductor body, and wherein the interconnections are integrated into the interconnect stack.

In an embodiment of the semiconductor device in accordance with the invention the physical structure has been integrated within the interconnect stack. By implementing the physical structure in the interconnect stack (that is also used for the interconnections between the active elements) it can be achieved that the information that is hidden in the physical structure has become less accessible, i.e. other layers need to be removed before the physical structure is exposed. These other layers may also be protection layers against physical and optical attacks.

In an embodiment of the semiconductor device in accordance with the invention the physical structure has been integrated on the interconnect stack. By implementing the physical structure on the interconnect stack the physical structure itself may be used to provide tamper resistance. Tampering of physical structure will cause a change an electrical property of the physical structure, which may be detected. Such a detected change may then be used to trigger erasure of the respective data contained in the electronic circuit.

In an embodiment of the semiconductor device in accordance with the invention the silicon-comprising dielectric layer comprises a material selected from the group comprising: silicon nitride, silicon oxide, and silicon oxy-nitride. These materials show a rough surface when deposited on the lead-zirconium-titanate layer and thus provide for a good variation in the respective electrical property of the physical structure. Further, the silicon-comprising dielectric layer may comprise hydrogen or organic residues/elements.

In a second aspect the invention relates to method of manufacturing a semiconductor device comprising a physical structure for use in a physical unclonable function, the method comprising:
  providing a lead-zirconium-titanate layer;
  depositing the silicon-comprising dielectric layer on the lead-zirconium-titanate layer using a vapor deposition technique for obtaining a silicon-comprising dielectric layer having rough surface, and
  providing the conductive layer on the silicon-comprising dielectric layer. The method of manufacturing in accordance with the invention follows the similar advantages and effects as the semiconductor device in accordance with the invention. Also, similar embodiments of the method can be easily derived from corresponding embodiments in the semiconductor device.

In an embodiment of the method in accordance with the invention a roughness of the rough surface is controlled by setting a specific vapor deposition temperature, within the range from 200° C. to 500° C. In general the surface roughness will increase with increasing temperature.

In an embodiment of the method in accordance with the invention the vapor deposition technique used is one of the group comprising: chemical vapor deposition, and atomic layer deposition. The advantage of using these deposition methods is that the surface of the silicon-comprising dielectric layer becomes rough. However, it is not ruled out upfront that other deposition methods will achieve the same result to a higher or to a lesser extent.

In a third aspect the invention relates to a card or an RFID tag comprising a semiconductor device in accordance with the invention. The card of the invention is preferably a smartcard containing any financial or private data or giving access to any building or information. For such smartcards the safety requirements show a steady increase, which is related to the increasing confidence and use of these smartcards. Alternatively, the card may be a transponder-type of card that can be read out in contactless manner. The card can be a banknote as well. In this case the integrated circuit must be very thin.

Another type of a card is a SIM-card for a mobile phone. In case of contactless readout the card will contain an antenna to communicate with the access device. The electronic circuit in the integrated circuit is then connected to said antenna. The physical structure, for example when part of a PUF, can provide for a certain security of the data on the card, as tamper protection and/or data encryption key.

These and other aspects of the invention are apparent from and will be elucidated with reference to the embodiments described hereinafter.

DETAILED DESCRIPTION OF THE PREFERRED EMBODIMENT

The invention aims at providing a semiconductor device comprising a physical structure for use in an unclonable function, which physical structure exhibits a larger variation in the respective electrical property. It is a further object of the invention to provide a method of manufacturing such semiconductor device.

In order to facilitate the discussion of the detailed embodiments a few expressions are defined hereinafter.

Throughout this description the term "interconnect layer" should be considered as synonym to "metallization layer" or "metal layer". Both terms are used interchangeably and have to be interpreted as the layer comprising conductors, the insulating layer in which the conductors are embedded, and any vias (=contacts) to underlying layers. These terms are well-known to the person skilled in the art of semiconductor technology.

Throughout this description the term "substrate" should be interpreted broadly. The substrate may comprise in an active layer at its front-side elements, e.g. transistors, capacitors, resistors, diodes, and inductors, which form the components of an electronic circuit. The substrate may further comprise interconnections between the elements which may be laid out in one or more interconnect layers. In the figures, the elements have been left out in order to facilitate the understanding of the invention. The active layer in which the elements are formed may also be called a semiconductor body. The semiconductor body may comprise any one of the following semiconductor materials and compositions like silicon (Si), germanium (Ge), silicon germanium (SiGe), gallium-arsenide (GaAs) and other III-V compounds like indium-phosphide (InP), cadmium sulfide (CdS) and other II-VI compounds, or combinations of these materials and compositions. The active elements together may form an electronic circuit. In any case, connection of the active elements is done via interconnect layers. These interconnect layers have parasitic capacitances which are defined by the dielectric constant of surrounding materials. The semiconductor body may even comprise contacts to lower layers (e.g. diffusion regions at the surface of an active region).

Throughout this description the term "physical unclonable function/structure" does not mean an absolutely-not-clonable function/structure. Instead it means that because of the high complexity and the physical laws it complies with, the function/structure is considered to be unclonable, i.e. unfeasible to physically replicate and/or computationally model.

Throughout this description the term "conductive layer" means a layer in which at least one conductor is laid out that is embedded by a dielectric in at least one direction parallel to a plane of the layer (i.e. parallel to a substrate on which the layer is provided). Alternatively, it can be a plurality of conductors in the same layer which are separated by a dielectric.

Figure 1:
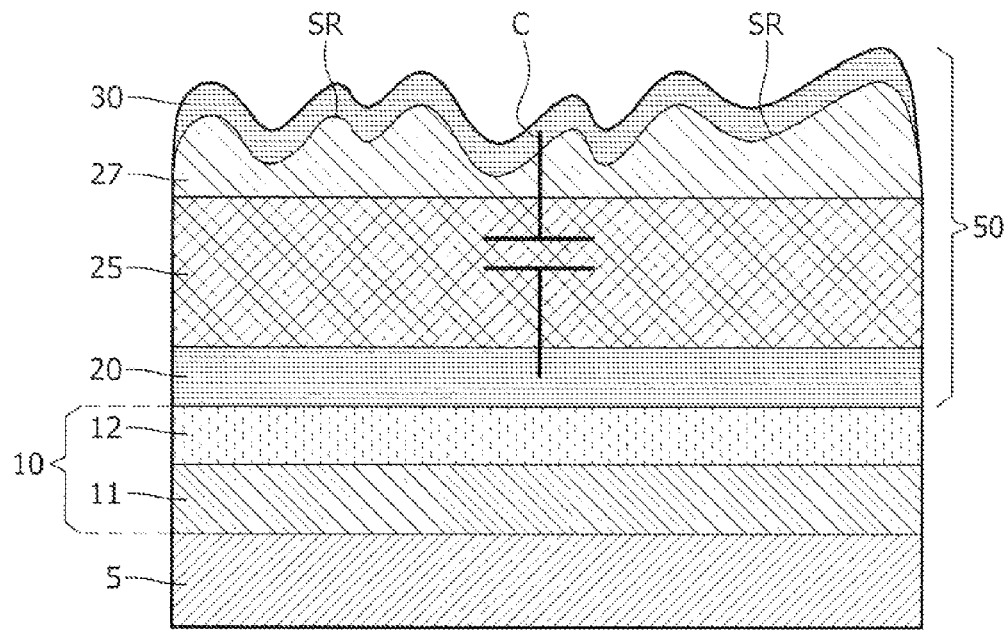
FIG. 1 shows a cross-sectional view of a semiconductor device with a capacitor for use in a PUF in accordance with a first embodiment of the invention.

FIG. 1 shows a cross-sectional view of a semiconductor device with a capacitor for use in a PUF in accordance with a first embodiment of the invention. The semiconductor device comprises a substrate 5 comprising a dielectric material, such as silicon oxide at its upper interface in this example. It must be noted that this may be other dielectric materials as well and even conductive materials (i.e. that need to establish a contact with the physical structure). In the substrate 5 there can be electronic components that together form an electronic circuit, such as an FRAM. On the substrate 5 there has been provided an adhesion layer 10, which comprises of a first sub-layer 11 and a second sub-layer 12. The first sub-layer 11 comprises titanium-oxide (TiOx) and the second-sub-layer 12 that has been provided on the first sub-layer 11 comprises titanium (Ti). Further a physical structure 50 is provided on the second sub-layer 12, which in this embodiment comprises a stack of a bottom conductive layer 20, a lead-zirconium-titanate layer 25 ($Pb_yZr_xTi_{1-x}O_3$, also called PZT layer), a silicon nitride layer 27 (provided on the PZT layer using a vapor deposition technique such as chemical vapor deposition), and a top conductive layer 30, respectively.

In this example, the bottom conductive layer 20 and the top conductive layer 30 comprise platinum (Pt) or an alloy of one or more elements of Mo, Ni, Cr, Ti, Si or W or from a semiconducting material such as Si. The adhesion layer 10 is, in this example, needed for establishing a good adhesion between the platinum of the bottom conductive layer 20 and the silicon-oxide in the substrate 5. In case of other conductive materials for the conductive layer 20 the adhesion layer 10 may have different compositions or may be even not required. It is considered to fall within the normal skills and routine of the person skilled in the art to determine if the adhesion layer is required and what composition it should have. Between the bottom conductive layer 20 and the top conductive layer 30 there is a capacitor C.

The silicon nitride layer 27 has a rough surface SR. Physically, the roughness of the surface SR shows a random behavior, i.e. every time the semiconductor device is manufactured again the surface is different. It is this random physical property which causes a value of the capacitor C to be random as well. The random variation is caused by two physical effects, namely the varying total dielectric thickness 25, 27 (because the thickness of the low-k silicon nitride layer 27 varies) AND the varying contribution of the low-k silicon nitride layer to the effective capacitance of the capacitor C. When a plurality of semiconductor device with a capacitor C is considered the capacitance versus device number exhibits a distribution, for example a Gaussian distribution. The spread in possible capacitance values is increased when:

the surface roughness is increased;
the capacitor area is not too large, i.e. or else the capacitance variations average out to much (but this reduces the overall capacitance value as well), and
the thickness of the PZT layer 25 is decreased with respect to the average thickness of the silicon nitride layer 27.

The silicon nitride layer 27 may, for example, also comprise silicon oxide or silicon-oxy-nitride material. And most likely many other silicon comprising dielectric layers will exhibit the same surface roughness, when deposited on the PZT layer 25 using a vapor deposition technique.

The rough surface SR of the silicon nitride layer 27 is most likely the result of physical-chemical process that happens during the vapor deposition. First, lead-oxide (PbO) reduction in the lead-zirconium-titanate (PZT) layer 25 is initiated by hydrogen. Subsequently, lead-oxide probably disintegrates into lead and oxide elements. The lead elements then act as catalyst in the deposition process which results the growth of nanostructures (in a vapor-liquid-solid mechanism). When the deposition process continues eventually the whole surface of the lead-zirconium-titanate layer 25 will be covered with material, however this surface SR will be rough. A typical surface roughness that can be achieved when depositing a silicon nitride layer 27 on a PZT layer 25 is characterized by a thickness that varies between 10 nm and 100 nm. In order to achieve a good spread in capacitance, the top conductive layer can be a platinum layer 30 with a thickness of 50 nm, for example. The PZT layer can be deposited by spin-coating followed by a rapid-thermal annealing step, both techniques being well-known to the person skilled in art. In an example embodiment the PZT layer comprises 3 sub-layers that are sequentially spin-coated and annealed, each sub-layer having a thickness of about 90 nm. This gives a total PZT layer thickness of about 270 nm. The bottom conductive layer 20 may have a thickness in the same order of magnitude as the top conductive layer 30, for example with a thickness of 50 nm. The effective k-value of the reference capacitor can be anywhere between 4 (k-value of low k silicon comprising dielectric material) and 800-1700 (k-value of high-k PZT layer) but the average value will be between about 50 and about 300 (using a 300 nm PZT layer combined with a 10-100 nm dielectric layer). All remaining steps in the method of manufacturing the semiconductor device of FIG. 1 are considered to be well known to the person skilled in the art.

Figure 2:
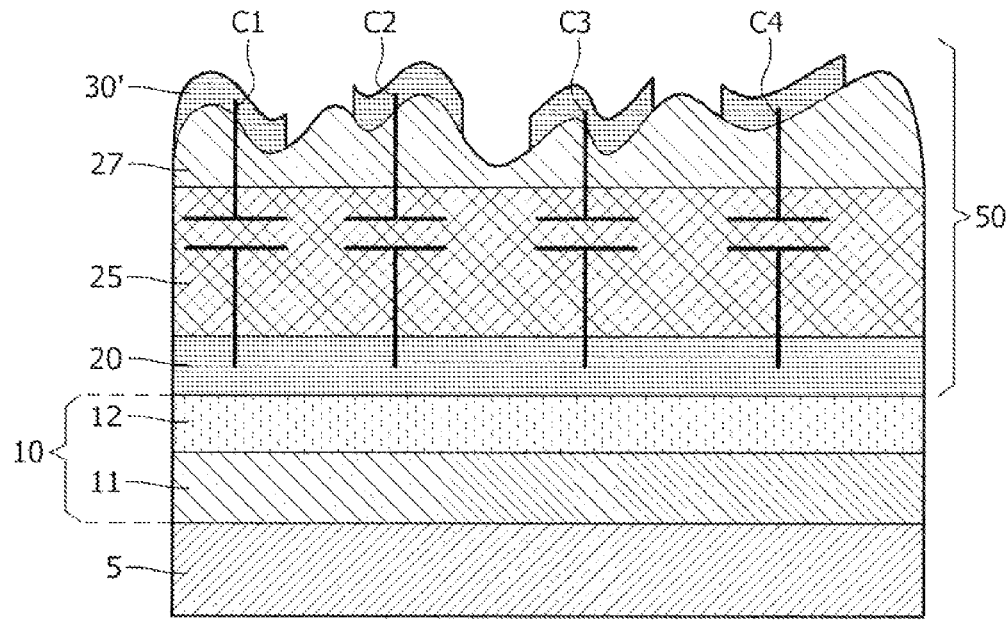
FIG. 2 shows a cross-sectional view of another semiconductor device with a capacitor for use in a PUF in accordance with a second embodiment of the invention.

FIG. 2 shows a cross-sectional view of another semiconductor device with a capacitor for use in a PUF in accordance with a second embodiment of the invention. This embodiment will be discussed in as far as it differs from FIG. 1. Whereas in FIG. 1 there is only one capacitor C, in FIG. 2 there is a plurality of capacitors that share a common electrode (the bottom conductive layer). This plurality of capacitors C1, C2, C3, C4 is obtained by patterning the top conductive layer 30'. Depending on the spread in capacitance value of the capacitor in FIG. 1 more or less data bits may be extracted for use in an encryption key in a PUF. In FIG. 2 the plurality of capacitors C1, C2, C3, C4 open up to possibility of extracting even more bits for use in the encryption key. A very important variant of FIG. 2 is a plurality of capacitors C1, C2, C3, C4 wherein the top conductive layer is a common electrode of all capacitors and the bottom conductive layers is patterned so as to form individual electrodes of the plurality of capacitors.

Figure 3:
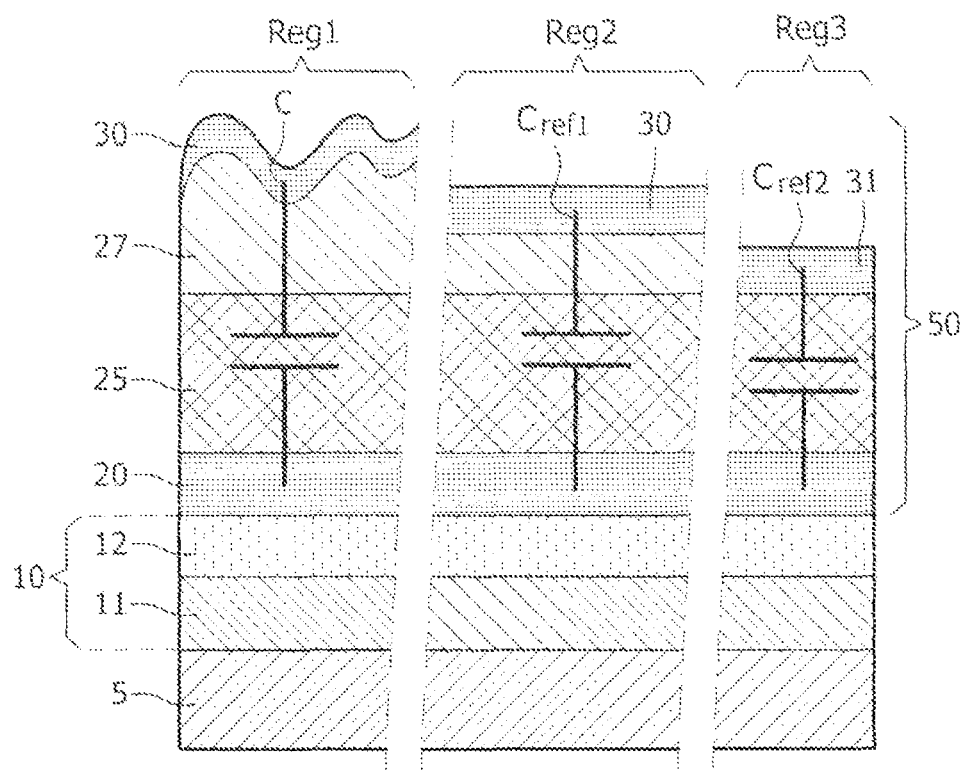
FIG. 3 shows a cross-sectional view of yet another semiconductor device with a capacitor and two reference capacitors for use in a PUF in accordance with a third embodiment of the invention.

FIG. 3 shows a cross-sectional view of yet another semiconductor device with a capacitor and two reference capacitors for use in a PUF in accordance with a third embodiment of the invention. The semiconductor device has three regions Reg1, Reg2, Reg3. The first region Reg1 comprises the capacitor C as discussed in FIG. 1 or, alternatively, a plurality of capacitors C1, C2, C3, C4 as discussed in FIG. 2. The second region Reg2 comprises a first reference capacitor Cref1. In the first reference capacitor Cref1 the silicon nitride layer 27, onto which the top conductive layer 30 is provided, has no rough surface. The first reference capacitance Cref1 can be manufactured as follows. After manufacturing of the silicon nitride layer 27 a CMP step or anisotropic etch step is carried out which flattens the upper surface of the silicon nitride layer 27. The silicon nitride layer 27 to be formed will then have a flat surface. The resulting reference capacitance Cref1 will have a relatively low k-value between the k-value of the silicon nitride layer 27 and the high k-value of the PZT layer 25.

The third region Reg3 comprises a second reference capacitor Cref2. The second reference capacitor Cref2 comprises a top conductive layer 30 that is directly provided on the high-k PZT layer 25. The second reference capacitance Cref2 can be manufactured in different ways. In a first variant the silicon nitride layer 27 is locally (at the third region Reg3) selectively removed (etched) before the top conductive layer 30 is provided. In a second variant a further conductive layer 31 is deposited (locally) before the silicon nitride layer 27 is deposited. In this case it may be better not to use Pt because of possible delamination of the silicon nitride layer 27. The k-value of the second reference capacitor is fully defined by the high-k PZT layer and lies thus in the range of 800 to 1700.

An alternative reference capacitor is obtained if the PZT layer 25 is locally selectively removed before the silicon nitride layer 27 is deposited. In that case a low-k reference capacitor (not shown) is obtained. The k-value is between 4 and 7 in that case.

It must be noted that the first reference capacitor Cref1, the second reference capacitor Cref2, and the alternative reference capacitor are all optional, which means: one of the three, none of them or any subset thereof. However, in some applications it may be beneficial to have reference capacitors available, for example for calibration purposes.

Figure 4:
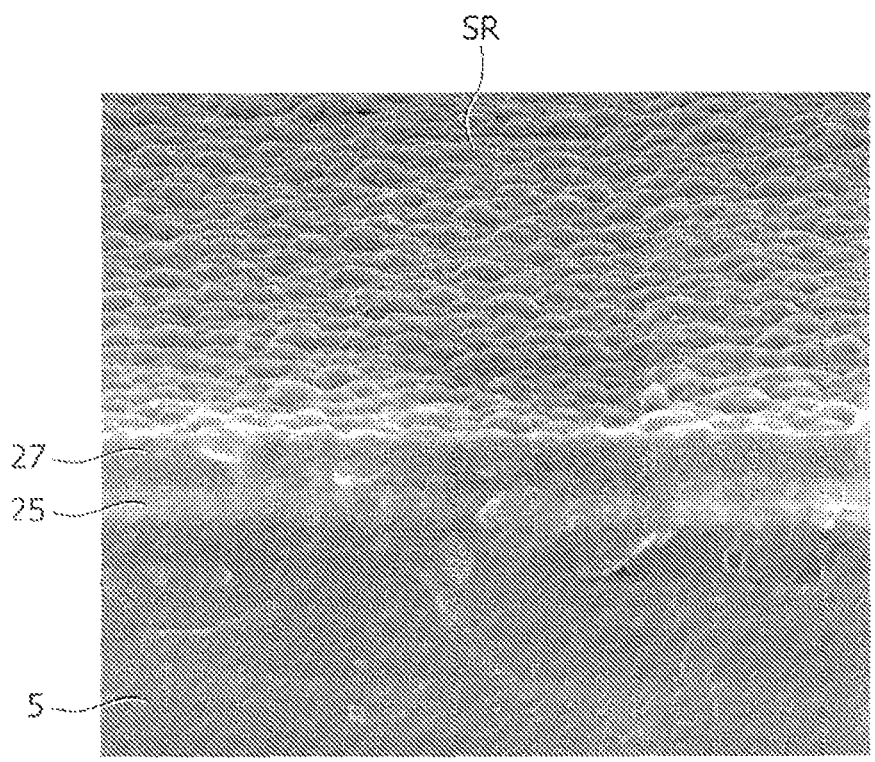
FIG. 4 shows a photograph of cross-section of a semiconductor device with a PZT layer and a silicon nitride layer deposited thereon using CVD.

FIG. 4 shows a photograph of cross-section of a semiconductor device with a PZT layer and a silicon nitride layer deposited thereon using CVD. On the photograph there is visible the substrate 5, the PZT layer 25, and the silicon nitride layer 27. The silicon nitride layer 27 clearly shows a rough upper surface SR. In one embodiment of the invention the rough surface may be used to create resistors having random resistance values (through deposition of a conductive layer on the rough surface SR). In another embodiment the varying thickness of the silicon nitride layer 27 may be used to create capacitors having random capacitance values.

Figure 5:
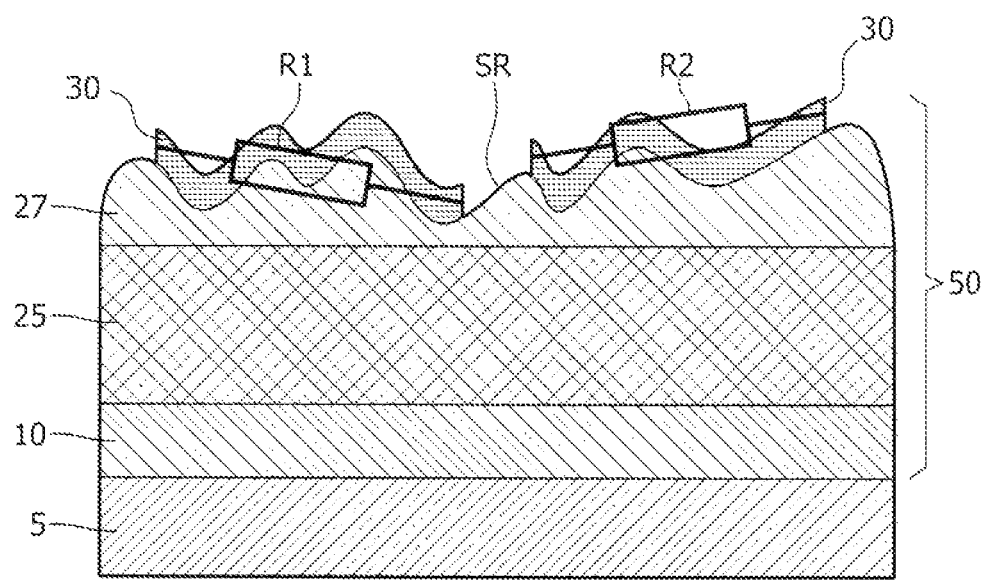
FIG. 5 shows a cross-sectional view of a yet another semiconductor device with a plurality of resistors for use in a PUF in accordance with a fourth embodiment of the invention.

FIG. 5 shows a cross-sectional view of a yet another semiconductor device with a plurality of resistors for use in a PUF in accordance with a fourth embodiment of the invention. This figure illustrates the second embodiment discussed in the previous paragraph. The rough surface of the silicon nitride layer (or silicon-oxide, silicon-oxy-nitride) is now used to create resistors R1, R2 having a variable resistance. The silicon nitride layer 27 may also contain hydrogen and organic elements. A patterned conductive layer 30 is formed on the rough surface SR for forming a first resistance R1 and a second resistance R2. In an example embodiment such resistors can be about 20 μm wide and about 500 μm long and 50 nm thick, and can be laid out in a meander shape. The sheet resistance for a platinum conductive line 30 of these dimensions is typically 70Ω/sq +−4.5, which is a spread of about 7%. The spread on the total resistance value is then smaller than 7%. If this spread is not large enough the conductive line 30 could be made thinner or the line can be made wider and/or shorter. Alternatively, a different conductive material having a larger sheet resistance could be used, which enables to make the lines shorter and increase the spread again.

In the figures the physical structure for use in a PUF has been discussed for both capacitive PUF's as well as resistive PUF's. In case of capacitive PUF's the physical structure can be combined with a coil which enables to transform the capacitance variation in a frequency variations in a LC-oscillator.

It is often desired to also protect a semiconductor device against tampering, i.e. attempts to obtain data stored in the semiconductor device, for example a smartcard or an RFID tag. Especially, when there is an encryption key stored in the semiconductor device a hacker may want to try to find the key in order to obtain the valid data. The physical structure in accordance with the invention may be advantageously applied (i.e. deposited) on top of an interconnect stack of a semiconductor device comprising an electronic circuit with secure data. Then, while trying to access the semiconductor device from the front-side the capacitance value of the capacitor or the resistance value of the resistor is changed which affects the encryption key extracted there from. In other words, it has become very difficult to find the valid data stored in the semiconductor device. Tamper resistance of semiconductor device, as such, is well-known to the person skilled in the art, including the use of special circuits and systems which feature or support the tamper resistance. For example, WO03/046802 discloses good examples of tamper resistance technique in combination with a tamper protection. This document teaches how to achieve tamper resistance by checking for the presence or damaging of the passivation structure (comprising a passivation layer). This document is hereby incorporated by reference in its entirety. The teaching of WO03/046802 is applicable to the invention without any difficulty. The physical structure can be applied between the interconnect stack and the passivation structure or between the passivation structure and a further passivation structure.

The invention thus provides a semiconductor device comprising a physical structure (50) for use in a physical unclonable function, wherein the physical structure (50) comprises a lead-zirconium titanate layer (25), and a silicon-comprising dielectric layer (27) deposited on the lead-zirconium-titanate layer (25), wherein the silicon-comprising dielectric layer (27) has a rough surface (SR), the physical structure (50) further comprising a conductive layer (30) provided on the rough surface (SR) of the silicon-comprising dielectric layer (27). The invention further provides a method of manufacturing such semiconductor device. The invention also provides a card, such as a smartcard, and to a RFID tag comprising such semiconductor device. The inventors have found that depositing of a silicon-comprising dielectric layer (27) on a lead-zirconium titanate layer (25) using vapor deposition results in a silicon-comprising dielectric layer (27) having a rough surface (SR). This rough surface (SR) can be used in a PUF to make a resistor (R) with a variable random value by depositing a conductive layer (30) on the rough surface (SR). Alternatively, the combination of both layers (25, 27) can be used in a PUF as composite dielectric to make a capacitor (C) with a variable random capacitance value.

The invention may be applied in various application areas. For example, the invention may be applied in data security for smartcards, RFID tags, Pay-TV chips. Such chips often contain a secret security key (encryption key) and carry out secret functions. The encryption key may be advantageously extracted from the physical structure in the semiconductor device in accordance with the invention. The physical structure may form part of a so-called physical unclonable function (PUF). The invention may also be used for securing communication with for example a mobile phone by an internal secure key. This may then be instead of identification via the SIM card which can easily be copied.

Several major benefits may be identified in these applications. First of all, the materials used in the physical structure have a higher thermal stability than the materials in conventional PUF's, like photoresist based PUF's. A consequence of this is that the materials can be used at higher temperatures. Secondly, in accordance with embodiments of the invention, due to the high dielectric constant of the PZT layer only a small surface area is needed to get capacitance values that are high enough for the application. Thirdly, the dielectric materials used in the invention have a high breakdown voltage which is essential for applications for automotive or in combination with ESD protection. The breakdown voltage may be as high as 3.4 MV/cm, which complies with 140 V for a 400 nm dielectric. And finally, the PZT layer also avoids the risk of pin-holes in the SiN capacitor layer, which gives a higher reliability of the physical structure.

The semiconductor device comprising the high-k dielectrics in accordance with the invention also enables integration with standard High-K products at the interface of the core of mobile phones and the communication ports with the outside world.

Even though a large part of the description deals with the deposition of a SiN layer on a PZT layer using CVD, the invention is definitely not restricted to such combination and such deposition technique only. The silicon nitride layer may be replaced by other silicon comprising materials such as $SiO_2$ (most likely in the tetra-oxy-silane (TEOS) form), and silicon-oxy-nitride. A CVD technique (such as physical-enhanced chemical vapor deposition (PE-CVD) or atomic layer deposition (ALD)) is preferred because silane is needed or another hydrogen containing precursor. Deposition temperatures are between 200° C. and 500° C. At lower temperatures the technique may not work properly anymore and at higher temperatures it is not compatible with the high-k dielectric layer and, even more important, with the circuitry it has to protect.

Various variations of the semiconductor device and electronic system in accordance with the invention are possible and do not depart from the scope of the invention as claimed. These variations for example relate to conductivity types of semiconductor layers/regions. N-type and p-type may be swapped in order to obtain PMOST devices rather than NMOST devices for example. Such alterations fall within the normal routine of the person skilled in the art.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage. Throughout the Figures, similar or corresponding features are indicated by same reference numerals or labels.

The invention claimed is:

1. A semiconductor device comprising a physical structure for use in a physical unclonable function, wherein the physical structure comprises a lead-zirconium titanate layer, and a silicon-comprising dielectric layer deposited on the lead-zirconium-titanate layer, wherein the silicon-comprising dielectric layer has a rough surface, the physical structure further comprising a conductive layer provided on the rough surface of the silicon-comprising dielectric layer.

2. The semiconductor device as claimed in claim 1, wherein the conductive layer comprises a plurality of conductors for forming a plurality of electrical elements for use in the physical unclonable function.

3. The semiconductor device as claimed in claim 2, wherein the plurality of conductors are formed as resistances for use in the physical unclonable function.

4. The semiconductor device as claimed in claim 1, wherein the physical structure further comprises a further conductive layer onto which the lead-zirconium-titanate layer is provided for forming at least one capacitor between the conductive layer and the further conductive layer.

5. The semiconductor device as claimed in claim 4, wherein locally the silicon-comprising dielectric layer is planar for forming a reference capacitor.

6. The semiconductor device as claimed in claim 4, wherein locally the conductive layer is directly provided on the lead-zirconium-titanate layer for forming a further reference capacitor.

7. The semiconductor device as claimed in claim 1, wherein the semiconductor device comprises a substrate and an electronic circuit integrated into the substrate.

8. The semiconductor device as claimed in claim 7, wherein the substrate comprises a semiconductor body and an interconnect stack provided on the semiconductor body, wherein the electronic circuit comprises electronic components and interconnections between the electronic components, wherein the electronic components are integrated into the semiconductor body, and wherein the interconnections are integrated into the interconnect stack.

9. The semiconductor device as claimed in claim 8, wherein the physical structure has been integrated within the interconnect stack.

10. The semiconductor device as claimed in claim 8, wherein the physical structure has been integrated on the interconnect stack.

11. The semiconductor device as claimed in claim 1, wherein the silicon-comprising dielectric layer comprises a material selected from the group consisting of: silicon nitride, silicon oxide, and silicon oxy-nitride.

12. A method of manufacturing a semiconductor device comprising a physical structure for use in a physical unclonable function, the method comprising:
    providing a lead-zirconium-titanate layer;
    depositing the silicon-comprising dielectric layer on the lead-zirconium-titanate layer using a vapor deposition technique for obtaining a silicon-comprising dielectric layer having rough surface, and
    providing the conductive layer on the silicon-comprising dielectric layer.

13. The method as claimed in claim 12, wherein a roughness of the rough surface is controlled by setting a specific vapor deposition temperature, within the range from 200° C. to 500° C.

14. The method as claimed in claim 13, wherein the vapor deposition technique used is one of the group consisting of: chemical vapor deposition, and atomic layer deposition.

15. A card or an RFID tag comprising a semiconductor device as claimed in claim 1.

* * * * *